Sept. 27, 1966 K. SCHUBERT 3,274,649
APPARATUS FOR THE PRODUCTION OF SHEATHED WELDING
ELECTRODES COMPRISING AN EXTRUDING MACHINE
Filed Oct. 24, 1965 3 Sheets-Sheet 1
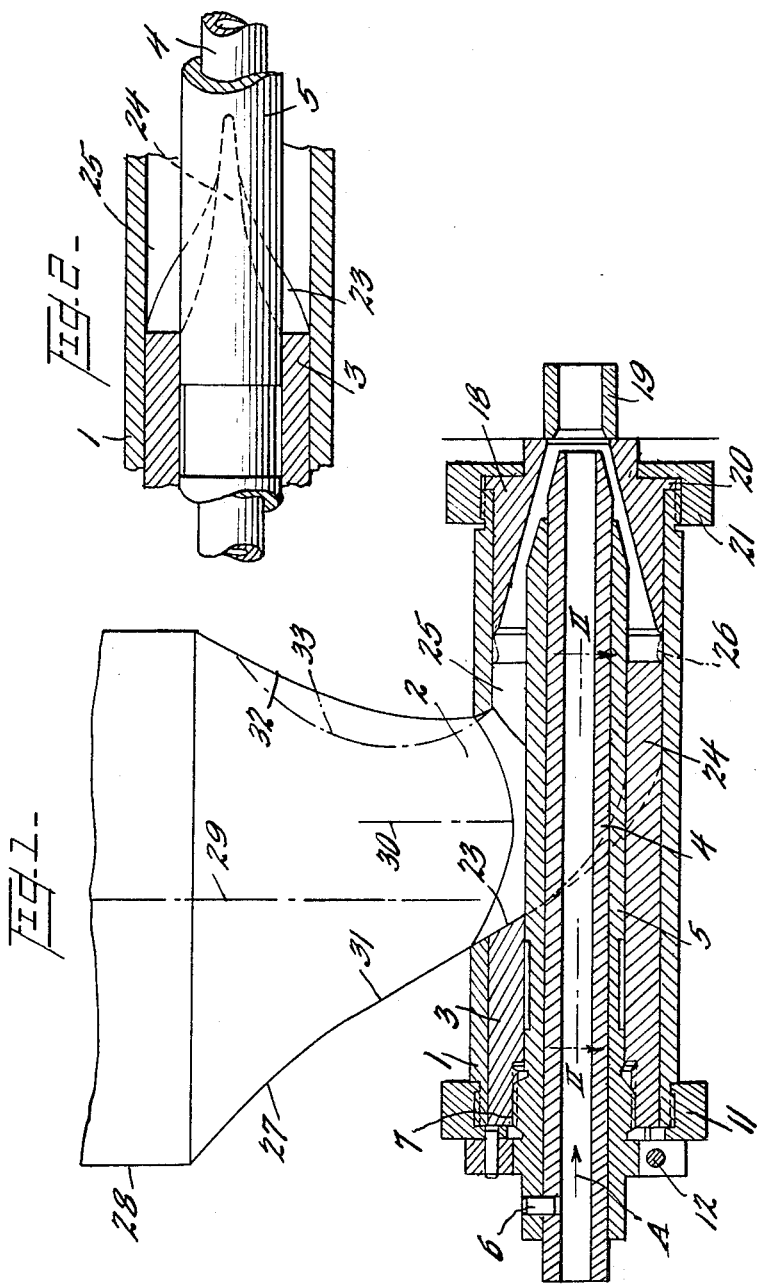
INVENTOR.
Karl Schubert,
BY
Watson, Cole, Grindle & Watson
ATTORNEYS

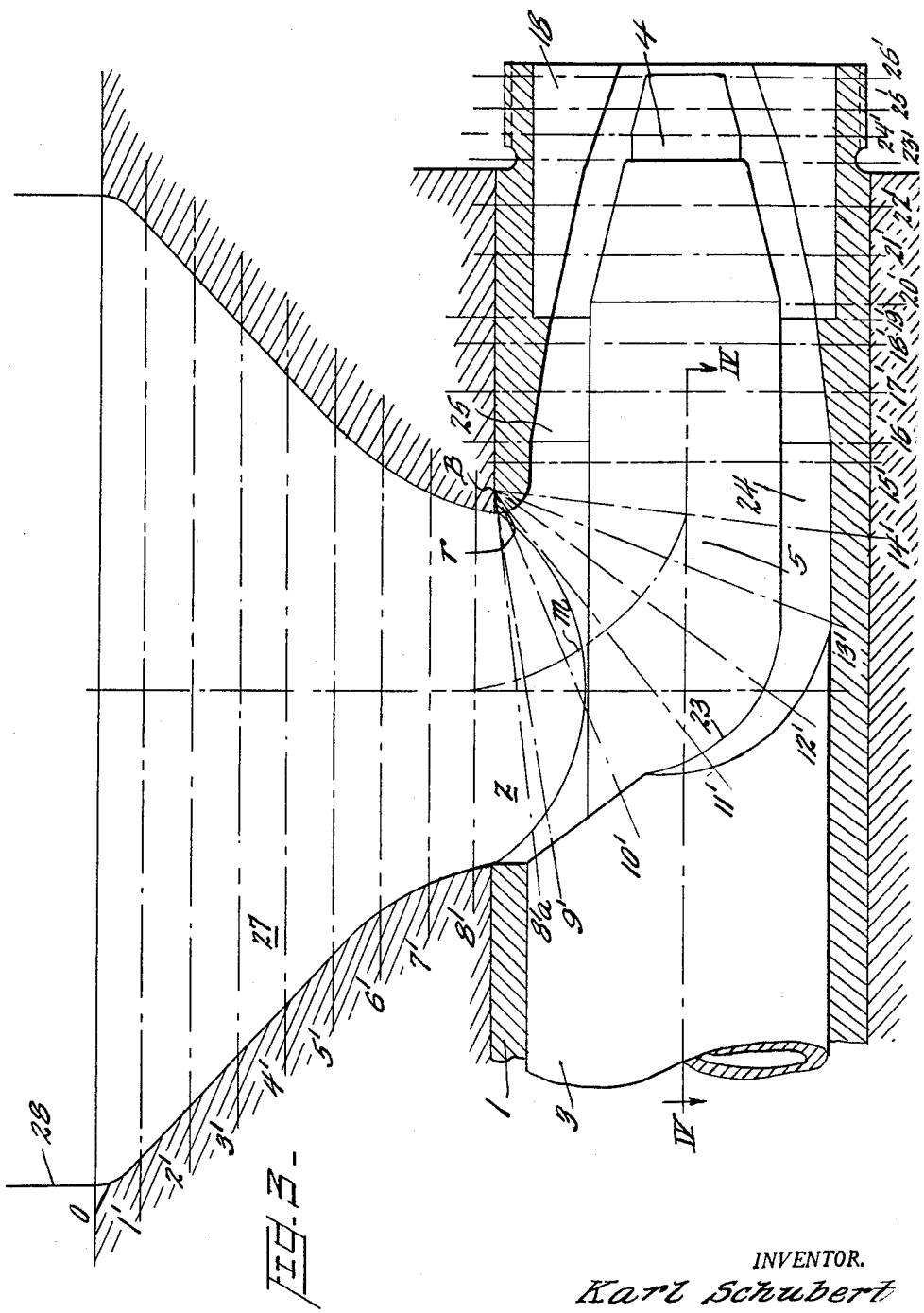

Sept. 27, 1966  K. SCHUBERT  3,274,649
APPARATUS FOR THE PRODUCTION OF SHEATHED WELDING
ELECTRODES COMPRISING AN EXTRUDING MACHINE
Filed Oct. 24, 1965  3 Sheets-Sheet 3
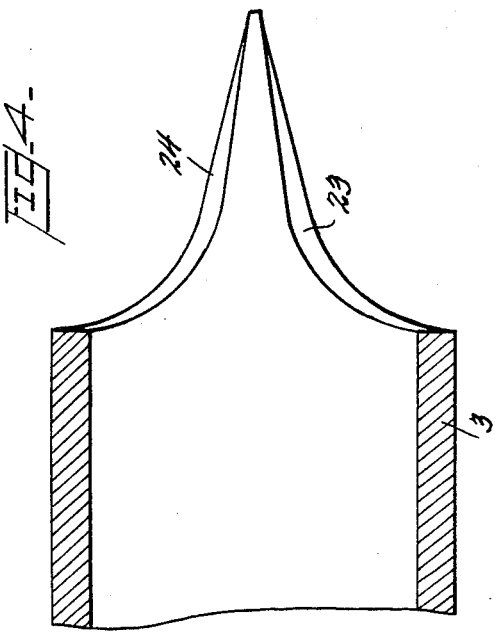
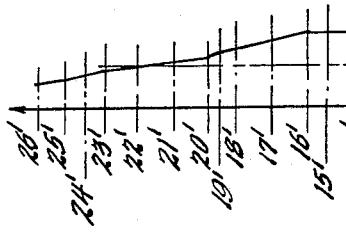
INVENTOR.
Karl Schubert,
BY
Watson, Cole, Grindle & Watson
ATTORNEYS United States Patent Office 3,274,649
Patented Sept. 27, 1966

3,274,649
APPARATUS FOR THE PRODUCTION OF SHEATHED WELDING ELECTRODES COMPRISING AN EXTRUDING MACHINE
Karl Schubert, Kaarst uber Neuss, Germany
Filed Oct. 24, 1965, Ser. No. 504,458
Claims priority, application Germany, Mar. 14, 1962, R 32,284
5 Claims. (Cl. 18—13)

This application is a continuation-in-part of application Serial No. 264,631, filed March 12, 1963 and now abandoned.

This invention relates to apparatus for the production of sheathed welding electrodes comprising an extruding machine having an extrusion cylinder arranged substantially transversely to the direction of movement of the electrode to be sheathed, so that the sheathing material is supplied substantially transversely to a feed chamber upstream of a forming nozzle with respect to that direction of movement. The sheathing material is supplied preferably by way of a feed hopper and through a feed orifice, and must therefore be deflected during its passage to the forming nozzle.

Known feed devices of this kind consists of a feed hopper adjoining the extrusion cylinder and which terminates in an orifice leading to the feed chamber upstream of the forming nozzle. Only the electrode wire guiding nozzle is arranged within this feed chamber, and there are, in the chamber, no means for diverting the sheathing material out of its feed direction into the direction of movement of the electrode wire. The sheathing material is left to itself on its way to the forming nozzle and in particular in the region where the deflection takes place. The result of this is that at some points a marked drop in pressure and unfavourable flow forms occur which render the covering of the electrode wire and in particular the satisfactory application of thin sheaths difficult.

Attempts have already been made to overcome these drawbacks by means of a different arrangement of the extrusion cylinder and the feed hopper. For example, the extrusion cylinder has been arranged at an acute angle to the direction of movement of the electrode wire, so that the central core of sheathing material is no longer supplied at right angles to the feed chamber upstream of the forming nozzle, but at an acute angle. However, satisfactory results have not been consistently obtained in this case at high run-through speeds of the electrode wires. Moreover, such an arrangement of the extrusion cylinder is undesirable in many extruding machines for constructional reasons.

The problem which the present invention seeks to solve is to provide a feed chamber in which undesirable drops in pressure no longer occur in the feed of the sheathing material and flow losses, especially during deflection of the sheating material, are kept as low as possible.

The starting point for the solution of this problem is the knowledge that marked pressure drops and variations in the feed of the sheathing material and in particular during the deflection thereof towards the forming nozzle are due to the fact that the cross-section of the known chambers changes repeatedly, especially in the region where the deflection takes place, and increases again after a reduction at some points, for example due to the presence of the electrode wire guiding nozzle, so that there are places in the chamber where the pressure in the sheathing material is low thereby interfering with the flow of sheathing material.

According to the invention, the feed chamber is therefore so designed between the extrusion cylinder and the forming nozzle, and in particular in the region where the deflection of the sheathing material takes place, that its cross-section decreases in accordance with a predetermined flow characteristic.

Advantageously, a flow characteristic is chosen according to which the cross-section of the feed chamber decreases approximately uniformly, in particular in the region where the deflection takes place. These measures enable a constant pressure pattern to be achieved over the entire cross-section of the feed chamber in the region where the deflection takes place, so that the flow losses are thereby reduced to a considerable extent.

In particular, the feed chamber may have a rear wall which, in use, deflects the sheathing material and has an aperture through which the electrode wire enters and which merges in the direction of the forming nozzle into a tongue-like portion and the cross-section of which changes according to the desired correction of the cross-section of the nozzle. This measure also prevents too great differences in the feed paths occurring over the cross-section of the region where the deflection takes place.

Moreover, the tongue-like portion of the rear wall of the feed chamber, into which the electrode wire guiding nozzle projects in addition to the electrode wire, is preferably formed as a support for the guiding nozzle. This has the extremely favourable effect that the guiding nozzle can no longer distort under the pressure of the sheathing material entering the feed chamber. The centricity of the wire with respect to the forming nozzle is thereby better maintained.

As a further advantageous subsidiary feature of the invention, the rear wall of the feed chamber is formed by the front face of a sleeve-like holder for the wire guiding nozzle and the other part of the feed chamber is formed by an outer jacket tube. In this way, the function of the holder of the electrode wire guiding nozzle can be used in a particularly suitable manner for producing an advantageous construction of the feed chamber.

Furthermore, the electrode wire guiding nozzle or at least a part thereof located in the region of the feed orifice of the feed chamber is advantageously arranged so that it can be rotated axially. This allows the electrode wire guiding nozzle, which becomes rather heavily worn by the flow of sheathing material at that part thereof which faces the feed orifice to be rotated after a certain time, so that those areas which are most heavily worn are moved to regions where the wear is lower and the electrode wire guiding nozzle has thus a longer life. A supporting tube encases the electrode wire guiding tube and extends also across the lateral feed orifice and forward in the direction of the forming nozzle beyond the lateral feed orifice.

By way of example only, two embodiments of the invention will now be described in greater detail with reference to the accompanying drawings, in which:

FIG. 1 is a longitudinal section of an embodiment of the invention,

FIG. 2 is a section on line II—II of FIG. 1, the section being at right angles to the plane of the section of FIG. 1, FIG. 3 is a longitudinal sectional view of a second modified form of an invention and illustrating a characteristic feature of the nozzle and feed chamber, FIG. 4 is a sectional view taken on line IV—IV of FIG. 3 in the direction of the arrows with the inner wire guiding tube being omitted, and FIG. 5 is a diagram showing graphically the flow lines in the outlet nozzle end according to FIGS. 3 and 4.

The embodiment of FIGS. 1 and 2 shown in the drawing consists essentially of an outer jacket tube 1 having in its wall a feed orifice 2 for the sheathing material and of a rear wall 23 which deflects the sheathing material in the direction A of movement through the machine of an electrode to be coated and which is formed by the end face of a nozzle holder 3 of annular cross-section. The nozzle holder 3 supports an electrode wire guiding nozzle projecting into a feed nozzle chamber 25. As can be seen in FIG. 2, on that side of the wire guiding nozzle remote from the feed orifice 2, the rear wall 23 merges into a tongue-like portion 24 extending in the axial direction towards a forming nozzle 18 and is so designed at this point that this portion serves as a support for the wire guiding nozzle. At the same time the transverse cross-section of the tongue-like portion 24 decreases towards the forming nozzle 18. The cross-section of the feed nozzle chamber 25 also decreases approximately uniformly in the region where deflection of the flow of sheathing material takes place.

In order to avoid any point of unsteadiness in the flow of sheathing material adjacent the termination of the tongue-like portion 24, the outer jacket tube 1 can be provided at this point with an inwardly projecting annular bead 26 shown in chain-dotted lines in FIG. 1 and which abuts the termination of portion 24. The bead 26 may be a complete annulus or a part-annulus. Due to the shape of the first portion of the annular bead, the feed nozzle chamber 25 is of reducing cross-section in the axial direction towards the forming nozzle 18. Furthermore, the annular bead is so shaped that it tapers gradually in the portion following the first portion, so that the cross-section of the feed nozzle chamber increases again. It is also possible, however, to design the adjacent forming nozzle 18 in such manner that it assumes the function of the annular bead.

As shown in FIG. 1, the forming nozzle 18, to which there is adjacent a sheathing nozzle 19 shown diagrammatically in the drawing, has an annular shoulder 20 which is in contact with the front end of the outer jacket tube 1 and is maintained in contact by a cap nut 21 which is screwed on to the outer jacket tube 1.

In the embodiment illustrated in the drawings, the electrode wire guiding nozzle is composed of an inner guiding tube 4 and an outer supporting tube 5, these two tubes being fixed together by a pin 6. The supporting tube 5 is furthermore provided with a screw thread 7 by which the wire guiding nozzle can be adjusted in the axial direction relatively to the nozzle holder 3 which is fixed to the outer jacket tube 1. In order to secure the electrode wire guiding nozzle against unintentional turning movements, a clamping device is provided which consists essentially of a radially-split, clamping ring 12 connected to a cap nut 11 screwed on to the outer jacket tube 1. By means of the screw thread 7 the outer supporting tube 5 of the wire guiding nozzle can also be turned when that part of the supporting tube 5 which faces the feed orifice 2 exhibits heavy wear caused by movement of the sheathing material over tube 5. With a rotation through, for example 90°, the result obtained is that the heavily worn parts are turned into a region where the wear is lower, so that the outer supporting tube 5 has a longer working life.

Connected to the feed orifice 2 outside the jacket tube 1 is a feed hopper 27, shown diagrammatically in FIG. 1, which leads to an extrusion cylinder 28, likewise indicated diagrammatically. This extrusion cylinder is so arranged that its longitudinal axis 29 is at right angles to the direction A of movement of the electrode wire and is located behind (with respect to the sheathing nozzle 19) the central axis 30 of the feed orifice 2. The feed hopper 27 must accordingly be shaped asymmetrically, namely in such manner that its wall 31 facing towards sheathing nozzle 19 is less sharply inclined than the opposite wall 32, so that the centre core of the sheathing material is not introduced at right angles into the feed nozzle chamber, but at an angle of less than 90°, which facilitates the deflection of the sheathing material towards the forming nozzle 18.

The wall 32 of the feed hopper may also be provided with a large inwardly-extending projection 33 or the like, which is so designed that a flow path of approximately the same length is obtained from the extrusion cylinder 28 to the forming nozzle 18 over the entire transverse cross-section of the feed inlet.

The modified form of the invention according to FIGS. 3 and 4 shows a feed guide similar to FIGS. 1 and 2. In these FIGS. 3 and 4 like reference numerals according to FIGS. 1 and 2 denote corresponding parts. The form of the wall curve 23 and the tongue-like part 24 of the nozzle holder 3 is formed in a careful and particular way. Along the way of the sheathing mass or material form the press cylinder 28 to the forming nozzle 18, there is indicated certain spaced cross-sectional lines 1' to 26'. The cross-section lines 8' to 14' have a common center point B and the radius line r indicates the inner edge of the curved section from the extrusion cylinder and feed hopper to the entrance to the nozzle and the curved line m in the center indicates the path of the material with the distance between the section lines being somewhat the same as the section lines 1' to 7'.

FIG. 5 shows a diagram to indicate the cross-sectional feed in the flow space and taken along the plane of the various sections. The individual section lines 1' to 26' from the ordinal divisions and the abscissa indications for the cross-section of the flow chamber are indicated on the diagram. It will be noted that at no place from the section line 1' to the section line 26' and particularly in accordance with the invention there is no turnoff from the section line 8' to the section line 15' beyond a cross-sectional narrowing of a cross-sectional widening. In this way objectionable loss and pressure and also unwanted flow form at the transition point is avoided so that in this way a higher speed of formation of a thin cover and uniform thickness can be produced.

A similar characteristic as in FIG. 5 is indicated for the modification according to FIGS. 1 and 2. According to the invention the characteristic formation of the wall 23 and the tongue 24 is provided for the nozzle holder 3. Thus the individual cross-sections will provide for a uniform distribution of the material so that the characteristic features of the invention are maintained by the cooperating cross-sections through the feed chamber. The correct cross sectional space for the feed nozzle chamber 25 is dependent on the diameter of the feed orifice 2 and the supporting tube 5.

I claim:

1. Apparatus for the production of sheathed welding electrodes comprising a nozzle holder in the form of a bored body member having a lateral feed orifice therein for the feeding an electrode sheathing material to the bore of said body member, an extrusion cylinder in front of said lateral feed orifice and arranged substantially transversely of said bored body, a forming nozzle positioned at an open end of said bored body, an electrode wire guiding tube positioned in said bored body and comprising a supporting tube which fits the outer wall of said bored body, the space between said lateral feed orifice and said forming nozzle comprising a feed chamber for said sheathing material and having a cross-section which decreases substantially constantly along the path of said sheathing material between said lateral feed orifice and said forming nozzle with no substantial increase in cross-section along the path between said lateral feed orifice and said forming nozzle.

2. Apparatus for the production of sheathed welding electrodes comprising a nozzle holder in the form of a bored body member having a lateral feed orifice therein for feeding electrode sheathing material to the bore of said body member, an extrusion cylinder in front of said lateral feed orifice and arranged substantially transversely of said bored body, a forming nozzle positioned at an open end of said bored body, an electrode wire guiding and supporting tube positioned in said bored body and comprising a supporting tube and a front portion extending across said lateral feed orifice and forward in the direction of said forming nozzle beyond said lateral feed orifice, an outer supporting tube surrounding and fitting over said first-mentioned tube and fitting the wall of said bored body member, the space between said lateral feed orifice and said forming nozzle being a feed chamber for said sheathing material, a rear end wall of said feed chamber being formed by the front wall of said outer supporting tube having a tongue-like portion extending in an axial direction towards said forming nozzle and supporting said electrode wire guiding tube, said front wall and tongue-like portion of said outer supporting tube being shaped so that said feed chamber has along the feeding way for said sheathing material between said lateral opening and said forming nozzle after a decrease in cross-section, no substantial increase in cross-section.

3. Apparatus for the production of sheathed welding electrodes comprising a nozzle holder in the form of a body member having a lateral feed orifice therein for feeding of electrode sheathing material to the bore of said body member, an extrusion cylinder in front of said lateral feed orifice and arranged substantially transversely of said bore, a forming nozzle positioned at an open end of said bore, an electrode wire guiding tube positioned in said bore and comprising a front portion extending across said lateral feed orifice and forward in the direction of said forming nozzle beyond said lateral feed orifice, a supporting tube encasing said electrode wire guiding tube and extending also across said lateral feed orifice and forward in the direction of said forming nozzle beyond said lateral feed orifice, the space between said lateral feed orifice and said forming nozzle forming a feeding chamber for said sheathing material and having a cross-section which decreases between said lateral feed orifice and said forming nozzle, said supporting tube being exposed to said sheathing material, having rotation symmetry and being arranged rotatable, and means for rotating and fixing said supporting tube from outside of said body member in an angular rotated position.

4. Apparatus for the production of sheathed welding electrodes comprising a nozzle holder in the form of a longitudinally extended bored body member having a longitudinal axis and a first and a second open end on said axis and a lateral feed orifice therein transversely of said longitudinal axis for feeding an electrode sheathing material to the bore of said body member, an extrusion cylinder in front of said lateral feed orifice having a longitudinal axis arranged substantially transversely of the longitudinal axis of said bored body member, a forming nozzle positioned at said first open end of said bored body member on the longitudinal axis thereof, an electrode wire guiding tube positioned in said bored body member on the longitudinal axis thereof and comprising a supporting tube which fits an outer wall of said bored body member on said second open end, the space between said lateral feed orifice and said forming nozzle comprising a feed chamber for said sheathing material and having a portion where deflection of the flow of sheathing material from the direction of the longitudinal axis of said extrusion cylinder into the direction of the longitudinal axis of said bored body member takes place, said feed chamber having a cross-section along said portion of deflection which decreases substantially constantly along the path of said sheathing material in the direction of the flow with no substantial increase in cross-section along said portion of deflection.

5. Apparatus for the production of sheathed welding electrodes comprising a nozzle holder in the form of a longitudinally extended bored body member having a longitudinal axis and a first and a second open end on said axis and a lateral feed orifice therein transversely of said longitudinal axis for feeding an electrode sheathing material to the bore of said body member, an extrusion cylinder in front of said lateral feed orifice having a longitudinal axis arranged substantially transversely of the longitudinal axis of said bored body member, a forming nozzle positioned at said first open end of said bored body member on the longitudinal axis thereof, an electrode wire guiding tube positioned in said bored body member on the longitudinal axis thereof and comprising a supporting tube and a front portion extending across said lateral feed orifice and forward in the direction of said forming nozzle beyond said lateral feed orifice, an outer supporting tube surrounding and fitting over said first-mentioned tube and fitting the outer wall of said bored body member on said second open end, the space between said lateral feed orifice and said forming nozzle comprising a feed chamber for said sheathing material and having a portion where deflection of the flow of sheathing material from the direction of the longitudinal axis of said extrusion cylinder into the direction of the longitudinal axis of said bored body member takes place, a rear end wall of said feed chamber on said portion of deflection being formed by a front wall of said outer supporting tube, said front wall of said outer supporting tube having a tongue-like portion extending in an axial direction towards said forming nozzle and supporting said electrode wire guiding tube, said front wall and tongue-like portion of said outer supporting tube being shaped so that said feed chamber has along said portion of deflection along the feeding way for said sheathing material in the direction of the flow after a decrease in cross-section and with no substantial increase in cross-section.

References Cited by the Examiner

UNITED STATES PATENTS

| | | | |
|---|---|---|---|
| 1,751,844 | 3/1930 | Schanz | 18—13 |
| 2,147,281 | 2/1939 | Coffin et al. | 18—13 |
| 2,702,410 | 2/1955 | Brown | 18—13 X |

WILLIAM J. STEPHENSON, *Primary Examiner.*